United States Patent [19]

Tsai

[11] Patent Number: 4,610,556
[45] Date of Patent: Sep. 9, 1986

[54] WRITING INSTRUMENT WITH PLURAL TIPS

[76] Inventor: Kuo-Lung Tsai, 4F. 27 Lane 160, Hsin Sheng S. Rd., Sec. 1, Taipei, Taiwan

[21] Appl. No.: 699,440

[22] Filed: Feb. 7, 1985

Related U.S. Application Data

[63] Continuation-in-part of Ser. No. 543,163, Oct. 18, 1983, abandoned.

[51] Int. Cl.$^4$ ............................................. B43K 27/00
[52] U.S. Cl. ........................................ 401/18; 401/23; 401/36; 401/37; 401/151; 401/199; 401/230; 401/223; 401/251
[58] Field of Search ................... 401/18, 36, 23, 17, 401/57, 89, 90, 151, 199, 230, 290, 34, 35, 37, 223, 251

[56] References Cited

U.S. PATENT DOCUMENTS

| | | | |
|---|---|---|---|
| 1,737,798 | 12/1929 | Kinzinger | 401/57 |
| 3,003,182 | 10/1961 | Rosenthal | 401/199 X |
| 3,203,025 | 8/1965 | Schreur | 401/199 X |
| 3,361,516 | 1/1968 | Rigondaud | 401/199 X |
| 3,402,008 | 9/1968 | Green | 401/199 |
| 3,572,954 | 3/1971 | Cheron | 401/18 |

FOREIGN PATENT DOCUMENTS

| | | | |
|---|---|---|---|
| 153513 | 11/1951 | Australia | 401/57 |
| 1250302 | 9/1967 | Fed. Rep. of Germany | 401/199 |
| 2124298 | 11/1972 | Fed. Rep. of Germany | 401/199 |
| 2437503 | 2/1976 | Fed. Rep. of Germany | 401/199 |
| 2634273 | 2/1978 | Fed. Rep. of Germany | 401/18 |
| 51-21778 | 5/1976 | Japan | 401/57 |
| 52-4104 | 1/1977 | Japan | 401/199 |
| 7907389 | 4/1981 | Netherlands | 401/199 |
| 903559 | 8/1962 | United Kingdom | 401/223 |
| 948431 | 2/1964 | United Kingdom . | |
| 1039667 | 8/1966 | United Kingdom . | |
| 1126699 | 9/1968 | United Kingdom . | |
| 1198016 | 7/1970 | United Kingdom . | |
| 1530685 | 11/1978 | United Kingdom . | |
| 2012575 | 8/1979 | United Kingdom | 401/290 |
| 2122953 | 1/1984 | United Kingdom | 401/209 |

Primary Examiner—Steven A. Bratlie
Attorney, Agent, or Firm—Nies, Webner, Kurz & Bergert

[57] ABSTRACT

A combination writing instrument comprising a plurality of nib devices detachably mounted at the front of pen holder, all of the nib devices being mounted in a head-to-tail connection with a uniform ink flow system to induce a constant and uniform ink flow from an ink reservoir to the front-most writing point for immediate and smooth writing, so that the user can select one of the nib devices to perform a desired writing purpose and enjoy a variety of writing modes.

7 Claims, 14 Drawing Figures

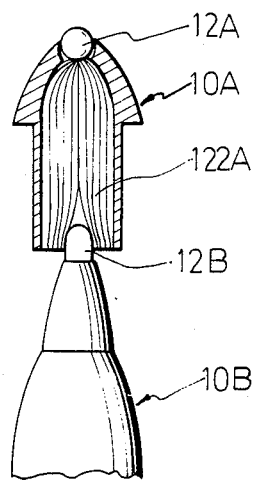
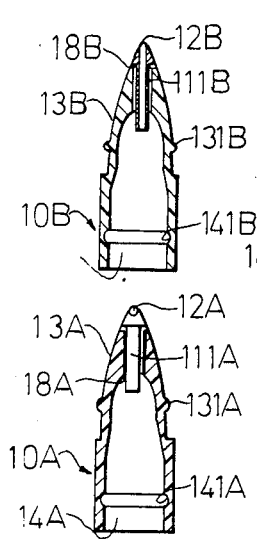
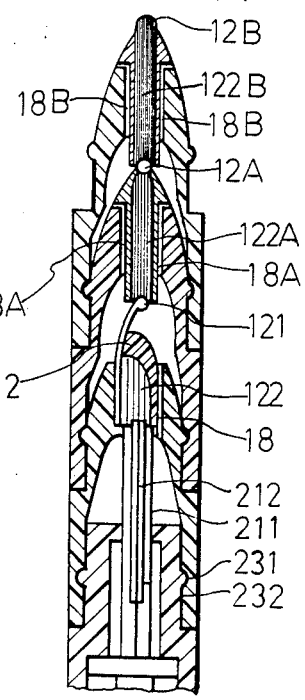
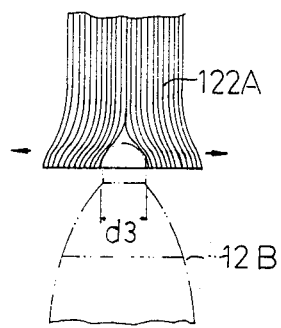
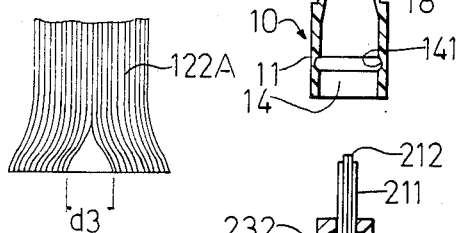
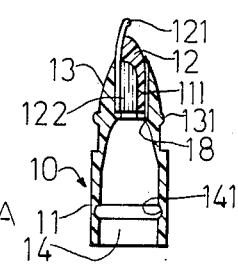
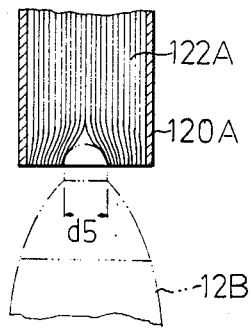
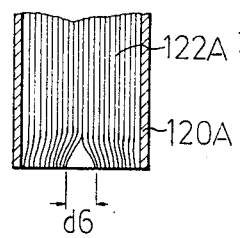
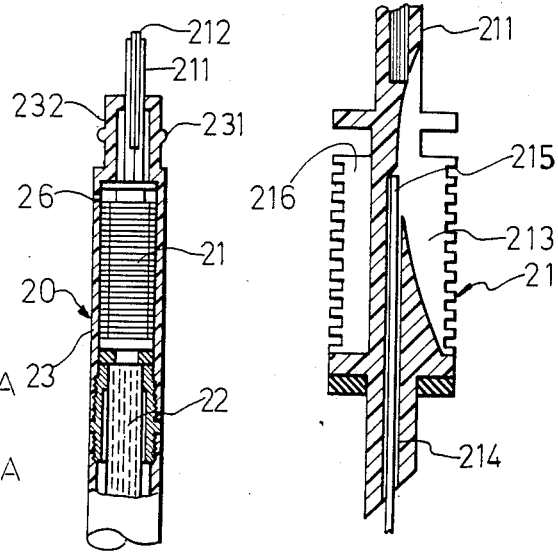

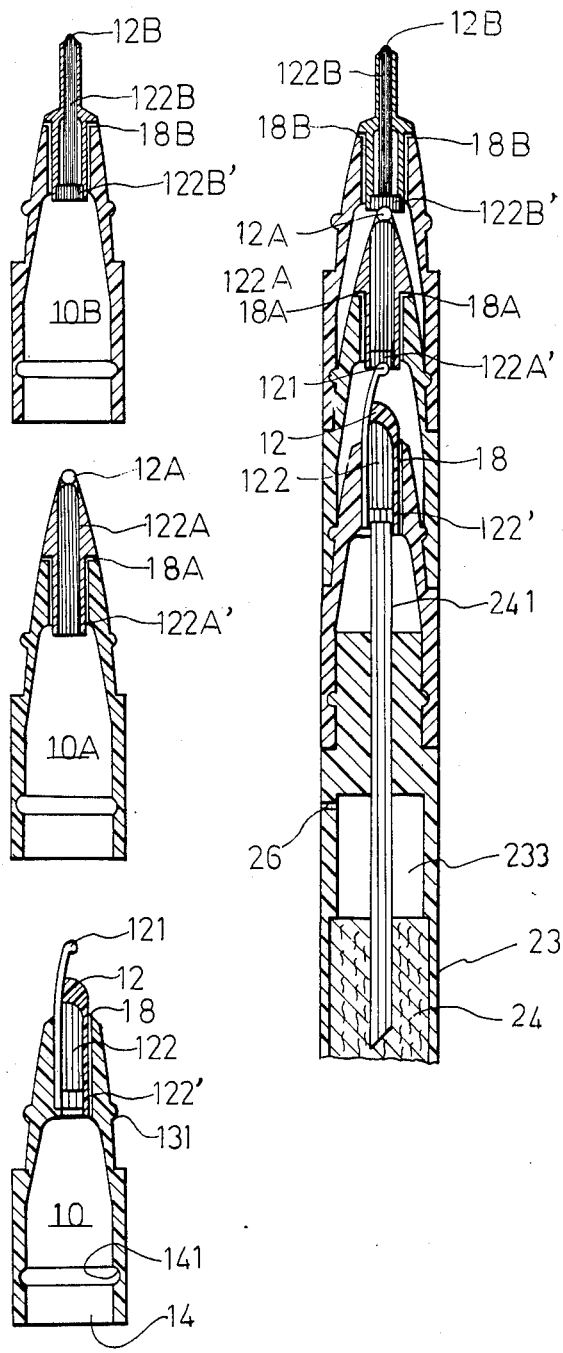

4,610,556

WRITING INSTRUMENT WITH PLURAL TIPS

This is a continuation-in-part of application Ser. No. 543,163 filed on Oct. 18, 1983, now abandoned.

BACKGROUND OF THE INVENTION

This invention relates in general to a kind of multipurpose writing device, and more particularly to a combination writing instrument which comprises a pen holding means with a mother pen nib, over which a pularlity of detachable sub-pen nibs are successively mounted one by one.

In conventional writing instruments, as each individual writing point requires its distinctive ink flow system so that when they are designed to mount in a manner of head-to-tail configuration, ink often does not feed smoothly from the ink reservoir to the point of the front-most writing nib. Moreover, if such configuration of writing instrument is positioned upsidedown for a period of time, ink retained in the front-most writing point will be sucked rearward the next successive pen nib or ink reservoir, especially when fountain pen nib is put in the front-most position. In this way, smooth writing at the beginning is not possible, and sometimes the pen will become unusable. For example, in a writing device such as described in U.S. Pat. No. 3,572,954, the rate of ink flow in marking member 17 is greater than that of sponge tongue 42, as shown in FIG. 3, when the whole writing device is positioned in an upsidedown position, i.e. put it in a shirt pocket, according to the present inventor's experimentation it is found that all ink retained in nib device B will soon be sucked back by the marker A so that at the beginning of each usage, no ink flow is attained immediately. Another problem is that when the front point 19 of stem 17 is worn away after a period time or when sponge 44 becomes aged, the length of the front-most writing tip 19 becomes shorter, the ink flow system will thus become unworkable.

In order to improve this drawback, Cheron further provides a washer 53 and orifice 54 as shown in FIGS. 4 and 5 to extend the contact area of tongue 42 and tip 19. However, the above mentioned drawbacks still can not be overcome, as the periphery of the sponge washer 53 provides no limitation means, so that when tip 19 is inserted therein, due to its swelling freely from the center to the outside, there is no benefit in attaining contact, especially while the front-most writing point is being worn away, a gap will be formed between washer 53 and tip 19 as shown in FIG. 9 of the attached drawings.

In order to make a further improvement, Cheron also provides a folded branch 128 at the end of stem 125 as shown is FIG. 10 of the attached drawing of the invention (corresponding to FIG. 12 of Cheron's patent). However, the diameter d2 of contacting area A2 between rear folded end of stem 125 and tracing point 63 is only one half of the diameter d1 of cross-sectional area A1 of stem 125, so that the total amount of ink flow from the tracing point 63 to the stem 125 will be only one quarter of that needed by the stem 125 to the ball 122. Therefore, when ball 122 is made to rotate rapidly for fast writing, ink supply to the ball 122 will soon be insufficient, causing broken lines and generally unsmooth writing.

In addition, with the excepting of the front portion of stem 125, the periphery of remaining length portion of stem 125 is free control. According to experiment by the present inventor, it has been found that at the time of the wet state of sponge, due to its swelling, the rear folded portion 128 of stem 125 will move toward the front as shown by arrow R1 and away from center as shown by arrow R2. This result may make the contacting area A2 become increasingly smaller. Moreover, the majority of the outer surface of stem 125 is exposed to the air, so ink contained inside the stem 125 may be easily evaporated, and ink residue may remain therein and disrupt the ink feeding function to the stem 125.

As described by Cheron, all the stems used in his patent are made from a synthetic sponge having a high coefficient of swelling. This means that excellent swelling function of a material like synthetic sponge retains a great deal of ink within the stem. In other words, it provides an excellent retention of ink inside the stem, but inferior conveyance of ink from one end of the other end. This means that basically, synthetic sponge material can not be used for the ink feeding material.

After extensive research, testing and improving, the present inventor has developed a combination writing instrument which provides multi-writing purposes with applicable writing modes.

The primary objective of the present invention is to overcome the defects of conventional fountain pens, ball point pens and sign pens which when combined together are not able to provide consistent smooth writing, and offer a combination writing instrument wherein a main nib device fits on the pen holding means and a plurality of sub nib devices are connected in a head-to-tail configuration to provide a constant ink flow system and attain smooth writing.

Another objective of the present invention is to provide a combination writing instrument having a single nib device with a series of different gauges for different kinds of drawing lines required, such as solid lines, shading lines, etc.

A further objective of the present invention is to provide a multi-purpose writing instrument of simple construction having easily exchangeable nib device devices and providing a uniform ink flow system to perform the most smooth writing any time and anyplace.

A still further objective of the present invention is to provide a multi-purpose writing instrument with a series of soft ink conducting means immediately provided at the rear end of each nib device and closely contacting the individual ink inducing means of each nib device to further ensure close contact of the largest possible area between each two nib devices to thereby form a part of uniform ink flow system and to assure smooth writing.

The above and other objects, features and advantages of the present invention will become more apparent when taken in conjunction with the apended drawings.

BRIEF DESCRIPTION OF THE DRAWINGS

FIG. 1 is an illustration of the basic concept of a connection of two pen nibs to ensure constant ink flow according to the present invention;

FIGS. 2A and 2B depict respectively two states of an ink inducing means without a holder, wherein the orifice remains unchanged upon pulling out a pen nib from the inducing means;

FIGS. 3A and 3B depict respectively two states of an ink inducing means with a holder, wherein the orifice becomes smaller after pen nib has been pulled out;

FIG. 4 is an exploded cross-sectional view of an embodiment of the first combination of nib devices in accordance with the present invention;

FIGS. 5A and 5B are a partly enlarged longitudinal cross-sectional view of FIG. 4;

FIG. 6 is an enlarged cross-sectional view of an embodiment of common capillary tube means in accordance with the present invention;

FIG. 7 is a cross-sectional view of a second combination of combination writing instruments according to the prefered embodiment of the present invention;

FIGS. 8A and 8B are enlarged cross-sectional views of a second embodiment of the present invention;

For the purpose of easy cross reference between the description of each preferred embodiment of the present invention, the same reference number and affixed letter of the alphabet designates the same portion or similar components of the present invention throughout the drawings.

It should be explained first that the present invention is to be equipped with water based ink, in that water based ink is able to be used in a fountain pen point nib, soft pen nib, plastic pen nib and ball pen nib at the same time with a uniform ink flow system of the present invention.

To better understand the important features of the present invention, and before going to describe the main text of this invention, the basic concept of a uniform ink flow system according to this invention will be described.

As shown in FIG. 1, the writing point 12B of rear nib 10B of this invention should be substantially inserted into the rear end of the ink inducing means 122A of front nib 10A to ensure the full contact of each of the two nibs, and to induce a constant ink flow from the ink reservoir to the front-most writing point. Referring to FIGS. 2A and 2B, two states of ink inducing means without encasing on the periphery thereof are shown, all of synthetic filaments of which are free to expand outwardly, as shown by the arrow, when a rear nib is substantially inserted thereinto. For example, when the tracing point of the nib 12B is inserted from the rear into the ink inducing means 122A of the front nib, an orifice having a diameter d3 is formed therein. The orifice will remain with the same diameter d3 when the rear nib is pulled out. It means that the density of said ink inducing means remain unchanged after tracing point is inserted thereinto. However, if the ink inducing means is encased with holder 120A as shown in FIGS. 3A and 3B, and all of filaments of ink inducing means are encompassed within the holder 120A, so that when the rear nib 12B is inserted into its rear end, the filament density will immediately be increased and thus the capillary tube function of the ink inducing means will also be improved. This will result in all of ink retained at the tracing point 12B being fed to the rear end of the ink inducing means and smooth writing for writing device. As described above, ink inducing means encased within a holder will limit its outward expansion force, so that the diameter of orifice d6 is smaller than that of orifice d5; that is, orifice d6, formed after tracing point 12B pulled out, is smaller than orifice d5 which was formed when a tracing point was inserted therein. This will prevent ink flow between two nibs from being disrupted due to wear on the tracing point.

From the above discussion, it has been also found that in order to provide a smooth ink flow and smooth writing, a uniform ink flow system according to this invention plays a very important role; namely, the ink inducing means and ink conducting means must meet the following conditions.

Figure 5B:
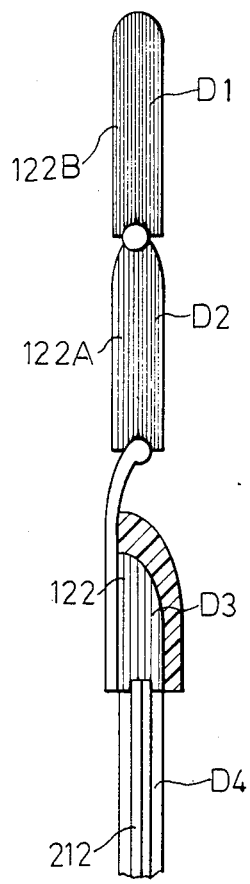
Figure 9:
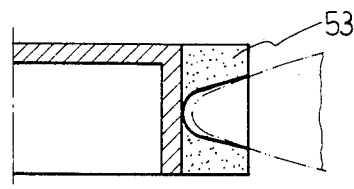
FIG. 9 is a sectional view, on a larger scale, of a part of the writing device, corresponding to FIG. 5 of Cheron's patent.
Figure 10:
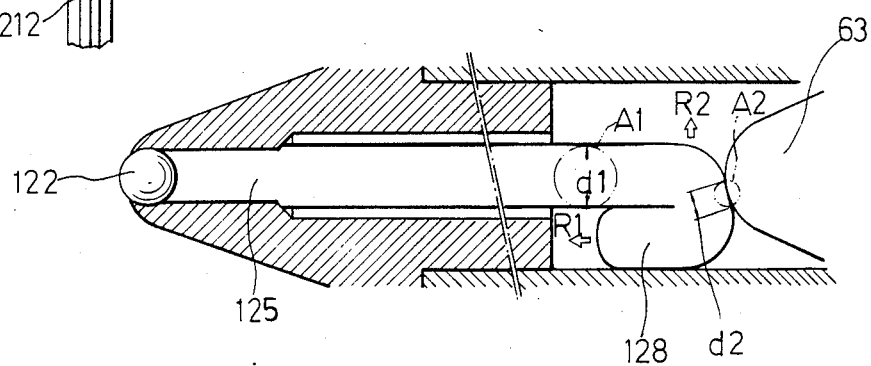
FIG. 10 is a sectional view, on a larger scale, of a part of another writing device, corresponding to FIG. 12 of Cheron's patent.

A. The sequential position of the writing device of ink inducing means or ink conducting means should be such that the density of the ink inducing means or ink conducting means which is used farthest from the ink reservoir is higher than that used nearest the ink reservoir; that is, the sequence of the density of ink inducing means should be $D1 > D2 > D3 > D4$ as shown FIG. 5B.

B. All synthetic filaments contained inside the ink inducing means and ink conducting means should be positioned and oriented in a straight direction as that of ink flow to facilitate ink inducing means and ink conducting means to perform a quick and constant capillary tube funtion.

C. Ink conducting means and ink inducing means of the pen nib should be fully encased, so as to define a higher density filament when any pen nib is inserted thereinto.

Therefore, it is clearly seen that the conventional fountain pen must be positioned immediately near the ink reservoir, otherwise the fountain pen will not be functional. It is thus demonstrated that writing devices of Cheron's patent (U.S. Pat. No. 3,572,954) as shown in his drawings FIGS. 1 to 10 are not practical.

As shown in the FIGS. 4 and 5, the combination writing instrument of the present invention comprises a mother nib device 10 and at least one set of similar or different sub-nib devices 10A capped on said mother nib device 10 and a pen holding means 20. Mother nib device 10, which is immediately connected with the pen holding means 20, includes a nib body 11 having a male coupling portion 13 at the front and a female coupled cavity 14 at the rear. At the front of nib body 11 is a fitting hole 111 for frictionally receiving the writing point 121. On the male coupling portion 13 is provided an annular matching convex ring 131 (or concave groove), and inside the coupled cavity 14 is an annular matched concave groove 141 (or convex ring) which serves to match the convex ring 231 on the front portion of the pen holding means 20 or the convex rings 131A, 131B of male coupling portions 13A, 13B to enable the mother nib device 10 to snugly cooperate with pen holding means 20 or with sub-nib devices 10A, 10B. The construction of sub-nib devices 10A and 10B is same as that of the mother nib device 10 so that their related descriptions are herein omitted. Nib body 11 of mother nib device 10 is insertable into the rear portion of sub-nib device 10A or 10B, such as another fountain pen nib 10 or ball point pen nib 10A or soft pen nib 10B (as shown in FIGS. 4 and 5). In the fountain pen nib 10, the pen nib 12 has an ink inducing member 122 with an air vent 18 to guide ink to the fountain pen point 121 for writing. At the center of the body of ball point pen nib 10A an ink inducing member 122A and an air vent 18A are provided to induce ink to the ball pen point for writing. As for the soft writing point 12B, it is inserted into the fitting hole 111B of its nib body 11B by an ink inducing core 122B and outside of which two diametrically disposed air vents 18B-18B are provided.

Referring to FIGS. 4 and 6, the pen holding means 20 of the present invention is similar to that of the conventional fountain pen, including an ink reservoir 22 at the rear and a capillary tube 21 at the front. The important feature of present invention, however, is to form a central ink inducing means by inserting a longitudinal ink inducing core 212 into the relatively smaller diameter portion 211 of capillary tube 21 and to cut a capillary groove 213 (see FIG. 6) on the middle portion of capillary tube 21, the front edge of said capillary groove 213 only terminating at the middle of the front smaller diameter portion 211 and communicating with the rear end of said ink including core 212, the depth of said capillary groove 213 being sufficient to reach the front end of an ink conducting pipe 215 which is extended through the central hole 214 so that ink will flow from the rear of pipe 215 to the front-most end of said core 212 through said capillary groove 213 with the aid of air channel 216 to form a part of a uniform ink flow system of the present invention.

Due to the frictional fit between the front end of said pen holding means 20 and the smaller diameter of front portion 211 of said capillary tube means 21 and the core 212 making no substantial contact with said pen holding means 20, no ink leakage will occur. In this manner, ink in the ink reservoir 22 will flow through the capillary tube means 21 then again through the ink inducing member 212 without causing any ink leakage. The front portion of pen holding means 20 is formed with a relatively smaller diameter engaging portion 232. On the outer surface thereof a matching convex ring 231 (or concave slot) serves to combine with the mother nib device 10 into the engagement portion 232. Thus ink will flow from the ink reservoir 22 through the capillary groove 213 of the capillary tube means 21 to the ink inducing member 212, then to writing point 12 for immediate writing.

The advantage of a writing instrument according to the present invention is that the mother nib device 10 connects with the pen holding means 20 with at least one more same nib device or with a different type of nib device 10A, 10B so as to conjunct each writing point 12, 12A, 12B of mother nib device or sub-nib device 10, 10A, 10B respectively with the front of the capillary tube means 21 or the front part of writing point 12, 12A, 12B or through an additional ink conducting member to be described hereinafter to guide the ink for immediate writing.

As shown in FIGS. 4 and 5, for an example, fountain pen point 12 is taken for mother nib device 10 in conjunction with pen holding means 20. The front of mother nib device 10 is capped with another ball pen point 12A of sub-nib device 10A. Again, one more sub-nib device 10B with soft writing point 12B is further attached to said sub-nib device 10A. The fountain pen point 12 of mother nib device 10 has an ink inducing member 122 fluidly connected with the ink inducing member 212 of capillary tube means 21 in pen holding means 20. The rear part of ball pen point 12A is connected with fountain pen point 121, and in the same manner the rear part of soft pen point 12B is connected with ball pen point 12A. Ink in ink reservoir 22 flows through capillary tube means 21 to the fountain pen point 121, then again through the fountain pen point 121 to the ball pen point 12A, and finally, ink is led from the ball pen point 12A to the soft pen point 12B for immediate writing. Under these circumstances, it is to be understood that to change the writing function, it is only needed to take off the soft pen nib 10B and to use the ball point pen 10A for writing; or to further take off the ball point pen 10A and to write with fountain pen point 121. Also the writing instrument of the present invention could be equipped the same function nib device but with a series of different gauges of the same nib device to perform engineering or artistic drawings, such as different fineness of solid lines and hatching and shading lines.

It is to be understood that in the junction of the rear end of sub-nib device 10B and the front end of sub-nib device 10A, as shown in FIG. 5, all of the exposed portion of rolling ball point 12A of sub-nib device 10A is completely inserted into and in contact with the rear end of soft ink inducing member 122B to securely establish the ink flow and to induce ink from the ink reservoir to the front-most writing point 12B and thus constitute a part of the uniform ink flow system of the present invention.

In the FIG. 7, a second combination of the nib device according to the present invention is shown, wherein the nib device consists of two fountain pen nibs 10—10 and one ball pen nib 10A or one soft nib device (not shown) at the front end.

To further effect the uniform ink flow of the present invention mentioned above, if necessary, an ink conducting member which is made of a soft and an ink guiding material, such as longitudinal synthetic fiber or filament of lower density than that of its corresponding ink inducing member, is provided at the rear of each nib device for enlarging the contact area of the writing point with ink inducing member. As shown in FIGS. 8A and 8B each rear portion of nib devices 10, 10A, 10B is further provided with a larger contacting portion of ink conducting members 122', 122A', 122B' after assembling the front-most writing point of each successive nib device is effectively inserted into the substantial portion of the rear end of each next front successive nib device. In this way, even clearance between each two nib devices or pen holding means is somewhat varied from lot to lot during manufacturing, or when the writing point of each rear nib is worn, making its length shorter than before, it will not affect the smooth ink flow within the uniform ink flow system of a combination writing instrument in accordance with the present invention. The rest of the components are almost the same as the first embodiment mentioned above and the related illustrations are omitted accordingly.

It is to be noted that as the writing point of the successively rear pen nib is completely inserted into the rear end of soft ink inducing member of the successively front nib device or ink conducting member to securely establish the sufficient amount of ink flow as mentioned above, and the amount of ink fed to each writing point is much greater than that of writing point actually needed, so that it is not necessary to arrange the sequence of the gauges of the same nib device from large to smaller in respect to the position of nib device nearest the ink reservoir.

The pen holding means 20 of the present invention could be made in the simple form of a pen nib as shown in FIG. 8B, so as to use the rear part of pen holding means 20 as an ink reservoir with an air vent 26 at its front part to guide ink flowing to the writing point for writing through the uniform ink flow system of the present invention. Thus, the construction of a writing instrument has been further simplified to cut down the production cost.

The preferred embodiment of the pen holding means 20 of the present invention as shown in the FIG. 8B is equipped with cellulose ink reservoir 24 with an air chamber 233 between cellulose ink reservoir 24 and pen body 23, and air vent 26 at the pen holding means to keep the ink inducing core 241, to easily guide ink to the pen point for writing.

As the writing point 12 on nib device of the present invention has commonly used the capillary tube means to guide ink, or induce ink through the ink inducing member in each front and rear part of successively connected nib devices. Thus, the pen holding means could be at least equipped with one nib device or more than two different kinds of nib device or different gauges of nib device. Different nib device could be taken off or assembled or changed at will to perform the best writing effect and to obtain optimum writing mode and to provide the most economical utilization.

I claim:

1. A combination writing instrument comprising:

a pen holding means having an ink reservoir at the rear and a common capillary tube means at the front;

a mother nib device, which includes a writing point, an ink inducing member connected with said writing point and a nib body holding said writing point and an air vent provided at said nib body, detachably fitted at the front of said pen holding means;

a pluralilty of sub-nib devices, one of which is capped on the front portion of said mother nib device, each said sub-nib device including a writing point, an ink inducing member immediately connected with said writing point and a nib body holding said writing point and an air vent provided at said nib body;

each of said ink inducing members of said mother nib device and said sub-nib devices having an ink conducting member of lower density than the corresponding ink inducing member provided immediately at the rear end thereof;

wherein ink will flow from said ink reservoir to the writing point of said mother nib device through said common capillary tube means, the ink conducting member of said mother nib device and the ink inducing member of said mother nib device and further guiding ink to the writing points of the front-most sub-nib device through the writing point of said mother nib device, the ink conducting members, the ink inducing members and the writing points of said subnib devices, positioned between said mother nib device and said front-most sub-nib device; said ink inducing members and said ink conducting members of said nib devices being made of a beam of synthetic filaments with longitudinal orientation, said filaments contained inside both said ink inducing members and said ink conducting members being oriented in a straight direction as that of ink flow, characterized in that (a) the front end of said capillary tube means is substantially inserted into the rear portion of said ink conducting member of said mother nib device;

(b) the writing point of said mother nib device is substantially inserted into the rear end portion of said ink conducting member of said sub-nib device immediately and successively positioned in front of said mother nib device;

(c) the writing point of said sub-nib device immediately and successively positioned in front of said mother nib device is further substantially inserted into the rear end portion of the next successively forward sub-nib device, so that a plurality of sub-nib devices are positioned in a form of head-to-tail configuration in front of said mother nib device;

(d) all of said filaments contained inside said ink conducting members and ink inducing members are fully encased by a tubular casing to limit outward expansion thereof when the front end of said capillary tube means or the writing points of said nib devices is substantially inserted thereinto;

(e) the density of said synthetic filaments of said ink conducting member and ink inducing member provided in said sub-nib device positioned immediately in front of said mother nib device is greater than that of the synthetic filamemts of the ink conducting member and ink inducing member provided in said mother nib device, respectively;

(f) the density of the synthetic filaments of the ink conducting member and ink inducing member provided in the next successively front sub-nib device is greater than that of the synthetic filaments of the ink conducting member and ink inducing member provided in said sub-nib device immediately in front of said mother nib device, respectively; whereby the density of the synthetic filament of the ink conducting member and ink inducing member provided in any one of the successively forward sub-nib devices positioned farther from said capillary tube means is greater than that of the synthetic filament of the ink conducting member and ink inducing member of said sub-nib device positioned nearer to said capillary tube means, respectively; and (g) the density of the rear end portion of each said ink conducting member is greater than that of the remaining portion thereof and a flexible orifice is formed in each of the rear end portion of said ink conducting member of said nib devices to thereby serve a suction function with said inserting front end of said capillary tube means or said inserting writing point of said mother nib device or sub-nib devices to enable ink to induce only from the direction of said capillary tube means to the writing point of said nib devices through their respective ink conducting member and ink inducing member to prevent ink feeding back to said capillary tube means when the entire writing instrument is positioned upsidedown to ensure constant and uniform ink flow from said ink reservoir to the writing point of the frontmost sub-nib device for immediate and smooth writing.

2. A writing instrument as defined in claim 1, wherein the length of said ink inducing memberr is shorter than that of the nib body of said mother nib device.

3. A writing instrument as defined in claim 1, wherein said mother nib device and each sub-nib device are of the same type of writing point but of different gauges.

4. A writing instrument as defined in claim 1, wherein the writing point of said mother nib device comprises a fountain pen nib, and the writing point of one of said sub-nib devices is a soft pen nib.

5. A writing instrument as defined in claim 1, wherein the writing point of said mother nib device comprises a fountain pen nib and the writing point of at least one of said sub-nib devices comprises a ball point pen nib.

6. A writing instrument as defined in claim 1, wherein the writing point of said mother nib device comprises a ball point pen nib and the writing point of at least one of said sub-nib devices comprises a soft pen nib.

7. A writing instrument as defined in claim 1, wherein the writing point of said mother nib device comprises a soft pen nib and the writing point of at least one of said subnib devices comprises a ball point pen nib.

* * * * *